(12) United States Patent
Stöber et al.

(10) Patent No.: US 7,391,441 B2
(45) Date of Patent: Jun. 24, 2008

(54) ELECTRONIC IMAGE SENSOR AND EVALUATION METHOD

(75) Inventors: Bernd Rüdiger Stöber, Rheda-Wiedenbrück (DE); Thomas Türke, Bielefeld (DE)

(73) Assignee: Koenig & Bauer Aktiengesellschaft, Wurzburg (DE)

( * ) Notice: Subject to any disclaimer, the term of this patent is extended or adjusted under 35 U.S.C. 154(b) by 674 days.

(21) Appl. No.: 10/504,319

(22) PCT Filed: Feb. 22, 2003

(86) PCT No.: PCT/DE03/00570

§ 371 (c)(1), (2), (4) Date: Aug. 24, 2004

(87) PCT Pub. No.: WO03/073745

PCT Pub. Date: Sep. 4, 2003

(65) Prior Publication Data

US 2005/0157185 A1    Jul. 21, 2005

(30) Foreign Application Priority Data

Feb. 26, 2002    (DE) ................. 102 08 289

(51) Int. Cl.
*H04N 5/228* (2006.01)
*H04N 5/235* (2006.01)

(52) U.S. Cl. ................. 348/222.1; 348/230.1
(58) Field of Classification Search ............ 348/207.99, 348/222.1, 230.1, 301; 283/75
See application file for complete search history.

(56) References Cited

U.S. PATENT DOCUMENTS

| 4,009,388 A | | 2/1977 | Seachman |
| 4,512,632 A | | 4/1985 | Tokumitsu et al. |
| 4,551,760 A | | 11/1985 | Bendell |
| 4,566,041 A | | 1/1986 | Shimano |
| 4,930,009 A | | 5/1990 | Shiota |
| 5,262,871 A | * | 11/1993 | Wilder et al. ............... 348/307 |
| 5,331,428 A | | 7/1994 | Uffel |
| 6,057,946 A | | 5/2000 | Ikeda et al. |
| 6,095,566 A | * | 8/2000 | Yamamoto et al. ............ 283/75 |
| 6,205,259 B1 | | 3/2001 | Komiya et al. |
| 6,278,533 B1 | | 8/2001 | Takemoto |
| 7,023,483 B2 | * | 4/2006 | Pollard et al. ............... 348/351 |
| 7,133,078 B2 | * | 11/2006 | Nagasawa ................... 348/353 |
| 7,236,651 B2 | * | 6/2007 | Ishitani et al. .............. 382/299 |

FOREIGN PATENT DOCUMENTS

| DE | 33 38168 A1 | 10/1983 |
| DE | 35 37220 A1 | 10/1985 |
| DE | 40 24618 A1 | 7/1990 |
| EP | 0 891 077 A2 | 1/1999 |
| EP | 1 028 595 A2 | 8/2000 |
| JP | 63240261 A | 3/1987 |
| JP | 2002051261 | 2/2002 |
| WO | WO 00/42381 | 7/2000 |

OTHER PUBLICATIONS

R.W.G. Hunt, "The Reproduction of Colour," Article, Fountain Press (London, England), p. 386-390, Published 1975.

* cited by examiner

*Primary Examiner*—Lin Ye
*Assistant Examiner*—James M. Hannett
(74) *Attorney, Agent, or Firm*—Jones, Tullar & Cooper, PC

(57) ABSTRACT

An electronic image sensor is used for evaluating an image. Several individual sensors, each of which is provided with several pixels, are utilized in the electronic image sensor. The pixels of at least one individual electronic image sensor are read out only in part. Individual image sectors are thus effectively masked to reduce the amount of image data to be processed.

9 Claims, 2 Drawing Sheets

ELECTRONIC IMAGE SENSOR AND EVALUATION METHOD

CROSS-REFERENCE TO RELATED APPLICATIONS

This application is the U.S. National Phase under 35 USC 371 of PCT/DE 03/00570, filed Feb. 22, 2003; published as WO 03/073745 A1 on Sep. 4, 2003 and claiming priority to DE 102 08 289.8 filed Feb. 26, 2002, the disclosures of which are expressly incorporated herein by reference.

FIELD OF THE INVENTION

The present invention is directed to a method for evaluating an electronic image sensor. The electronic image sensor has several individual sensors that each include several pixels. The pixels of at least one sensor are only partially read out.

BACKGROUND OF THE INVENTION

Image sensors of the type used in the present invention are called line sensors and are constructed from a multitude of light-sensitive pixels that are arranged along a line. The individual pixels convert input light signals into electrical signals and therefore permit an electronic evaluation of the image information recorded by operation of the image sensor. Such line sensors are employed, for example for inspecting printed products, and in particular are used for inspecting security documents.

The number of pixels required in the line sensor is substantially a function of the width of the object to be recorded and of the resolution required for the line sensor's application in connection with the object to be recorded. Since the width of the object to be recorded can vary greatly, depending on the application, and since increasingly smaller structures are required to be detected, special high-resolution sensors have been employed in prior art devices, which high powered sensors entail substantial purchasing costs.

DE 40 24 618 A1 discloses a device for detecting surface information by the use of several sensors, each of which has a lens arrangement assigned to it. The surface information is supplied to these lens arrangements by beam splitting devices.

DE 33 38 168 A1 shows a sensor with several pixels, which pixels can be selectively switched on.

JP 63-240 261 A shows two line sensors, to each of which an optical device is assigned and whose image areas overlap. These overlapped areas are memorized and are selectively read out from the memory.

U.S. Pat. No. 4,009,388 discloses an image sensor having several individual sensors, each with several pixels. Each individual sensor is assigned to its own optical device.

SUMMARY OF THE INVENTION

The object of the present invention is directed to providing an electronic image sensor and to a method for evaluation of an electronic image sensor.

In accordance with the present invention, this object is attained by evaluating an electronic image sensor that has several individual sensors. Each of these individual sensors has several pixels. The pixels of at least one of the individual sensors are only partially read out. Individual image areas can be selectively blanked out in order to reduce the amount of image data to be processed. Each pixel can provide its own image data to the evaluating device. All of the pixels of at least one individual sensor can initially be read out to determine the location of a character. A decision can then be made as to which pixels are not read out. The pixels to be blanked out are changeable in accordance with the movement of the object to be recorded.

The present invention relies on the basic concept of replacing a costly special single sensor of the desired line widths by a combination of several individual sensors, which several individual sensors can be individually controlled and evaluated. Such individual sensors are available in the form of standard components and therefore are relatively inexpensive. The number of the individual sensors required can be varied, depending on the desired width of the image sensor, in order to assure the sensor with the required width as a whole. In this case, each one of the individual sensors is equipped with its own optical device for representing an image area. To be able to employ the image sensor as a line sensor, the individual sensors are arranged side-by-side in the direction of their longitudinal axes, wherein a defined distance exists between the individual sensors, with the distance depending on the particular use. However, all of the individual sensors are controlled together and are evaluated by an evaluating device, so that image information entering the evaluating device corresponds to the image information which would be produced by a special sensor of the corresponding width.

All of the individual sensors are arranged on a common support element in order to assure a sufficiently exact alignment of the individual sensors with respect to each other. This common support element can be configured as an electronic board in particular, on which electronic board the individual sensors have been placed. It is also possible to provide a portion of the electronic control and evaluation elements of the evaluating device on the electronic board.

It is particularly advantageous if the individual sensors are each configured as partially readable sensors. With such partially readable sensors, it is possible to blank out individual pixels of each of the individual sensors as a function of each individual pixel's respective geometric arrangement in the individual sensor. If, for example, it is known that no relevant image information is to be expected in a certain image section, this image area of the individual sensor can be blanked out by an appropriate control of the partially readable sensors, so that the amount of image data to be evaluated in the evaluating device is correspondingly reduced.

It is also possible, in particular, to use area sensors for producing an image sensor in accordance with the present invention, wherein at least one line of the area sensor is controlled as an image sensor, while the other lines of the area sensor are not read out.

If the individual sensors are configured as partially readable color area sensors, it is also possible to record color information by an appropriate control of a line pair of the color area sensors, and to forward the recorded color information to the evaluating device.

CMOS sensors, or complementary metal oxide semiconductor sensors, are particularly suited for forming image sensors in accordance with the present invention. They are available at a very advantageous cost to output ratio.

These CMOS sensors have a structure corresponding to a memory module, so that individual pixels can be interrogated like memory cells. Thus, it is only necessary to read out image elements which are actually intended to be evaluated.

A defined distance exists between the individual sensors of the image sensor. However, because of the provision of optical devices that are arranged in front of the individual sensors, it is possible to represent a wider image segment on the individual sensors. So that all areas of the object to be recorded can be evaluated, the image sensor can be arranged at a distance relative to the object to be recorded, so that the image areas of the object to be recorded, which image areas are each ones that can be covered by the individual sensors, overlap, at least partially. In such a case, the overlap areas, which are then each recorded twice by respectively adjoining sensors, can be filtered out by the use of appropriate evaluation algorithms in the evaluating device.

BRIEF DESCRIPTION OF THE DRAWINGS

Preferred embodiments of the present invention are represented in the drawings and will be described in greater detail in what follows.

Shown are in

DESCRIPTION OF THE PREFERRED EMBODIMENT

Figure 1:
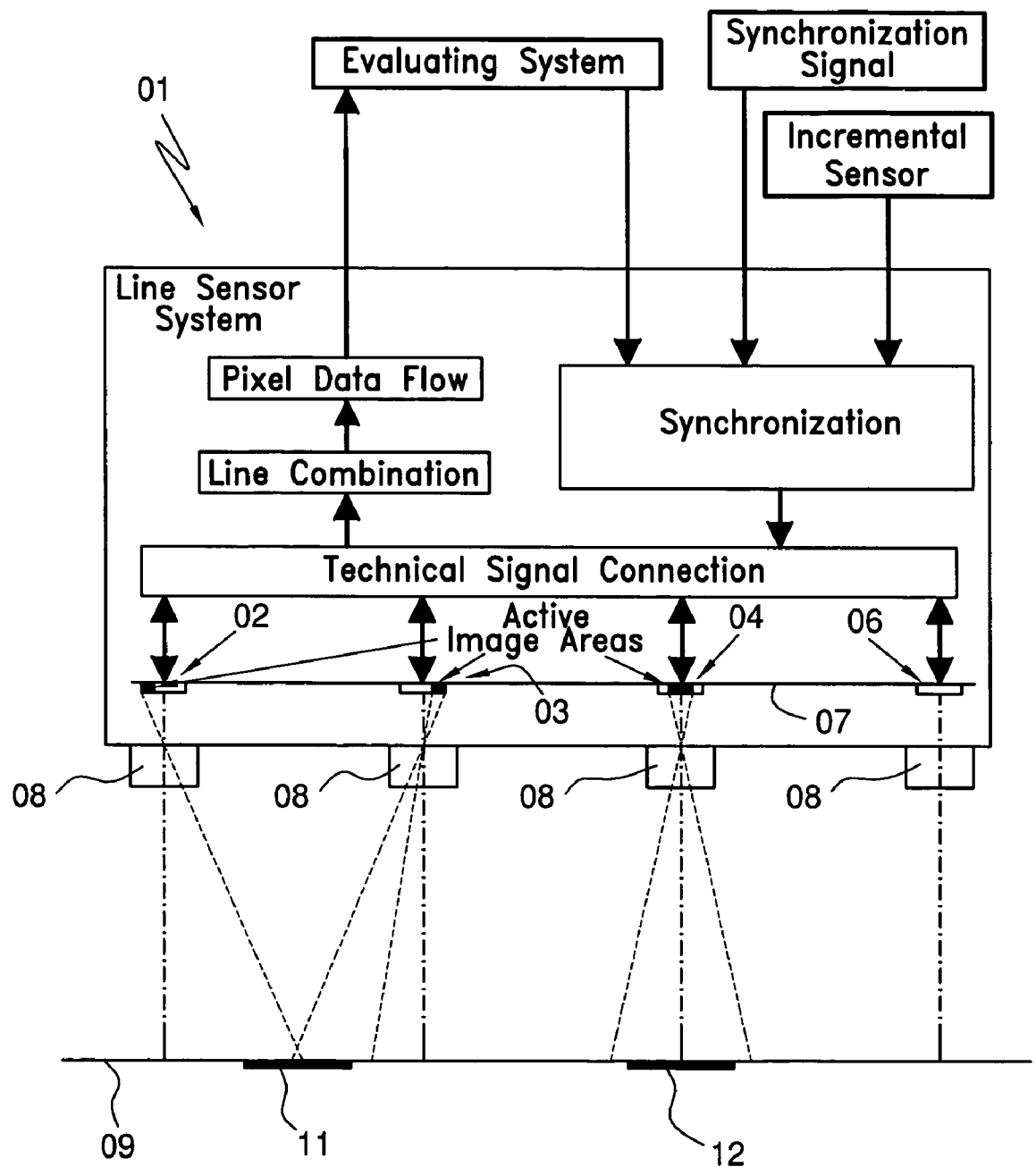
FIG. 1, a schematic depiction of the structure of an image sensor in accordance with the present invention, in a first operational state, and in FIG. 2, the image sensor shown in FIG. 1 and schematically depicted in a second operational state.

Referring initially to FIG. 1, there may be seen generally at 01 a preferred embodiment of an image sensor in accordance with the present invention. The image sensor 01 represented in FIG. 1 has four individual sensors 02, 03, 04, 06 arranged side-by-side, and which are arranged in this side-by-side array on a common electronic board 07. An optical device 08 is assigned to each one of the individual sensors 02, 03, 04, 06. By using each optical device 08, an object 09 to be recorded can be reproduced on the individual sensors 02 to 06 along a line. As depicted in FIG. 1, the individual sensors 02, 03, 04, 06, the optical devices 08 and the object 09 to be recorded are each arranged along a straight line. The image areas of the object 09 to be recorded are located directly opposite each optical device 08.

The properties of the optical devices 08 and the spacing between the image sensors 01 and the object 09 to be recorded have been selected in such a way that, on the one hand, the entire width of the object 09 to be recorded can, in principle, be reproduced on each of the individual sensors 02 to 06 and, on the other hand, the image areas which can be recorded by each of the individual sensors 02 to 06 have at least a slight overlap.

Each one of the individual sensors 02 to 06 is constructed utilizing a multitude of pixels which are arranged side-by-side, and which can be individually controlled as a function of their geometric arrangement. This permits the selective blanking-out of individual image areas in order to reduce, in this way, the amount of image data which is required to be processed.

To determine which image areas of the object 09 to be recorded can be blanked out, for the purpose of reducing the amount of image data to be processed, it is first necessary to read out all of the pixels, of at least the individual sensor, for determining the position of a characteristic. On the basis of the detected position of the characteristic, it is now determined which pixels are not to be read out. These pixels can then be blanked out. Thereafter, only the remaining pixels are read out, so that each pixel which has not been blanked out, or turned off provides its own signal to the evaluating device.

In the operational state of the image sensor 01, in accordance with the present invention, as represented in FIG. 1, the object 09 to be recorded has two important characteristics 11 and 12, whose presence and whose geometric positions are to be evaluated by the evaluating device. The other areas of the object 09 to be recorded are not relevant to the evaluation of the object 09 to be evaluated. In order to be able to perform this evaluating process in a simple manner, the pixels of all of the individual sensors 02 to 06 are initially selectively read out. Since no important characteristics are located in the image area of the object 09 to be recorded, as scanned by the individual sensor 06, the pixels of the individual sensor 06 are not read out at all, so that the corresponding image area of the individual sensor 06 is completely blanked out. The parameters necessary for the limitation of the image field can be preset in the image sensor by the evaluating device.

The important characteristic 12 of the object 09 to be recorded is recorded by the center pixels of the individual sensor 04. Accordingly, only those center pixels of the individual sensor 04 are read out, while those pixels arranged at the left and right edges of the individual sensor 04 are blanked out.

The important characteristic 11 is located on the object 09 in such a location or position that it is partially recorded by each of the individual sensors 02 and 03. Since only the position of the characteristic 11 is of interest, the individual sensors 02 and 03 are controlled in such a way that only the pixels at the left edge of the individual sensor 02, and only the pixels at the right edge of the individual sensor 03 are read out. All other pixels of the individual sensors 02 and 03 are not read out, so that the corresponding image areas of the object 09 are blanked out. The overlap area is calculated in the evaluation of the image data provided by the individual sensors 02 and 03 in the image sensor. In addition, the image data are recalculated in such a way that the data to be evaluated correspond to the geometric shape of the characteristic 11.

Figure 2:
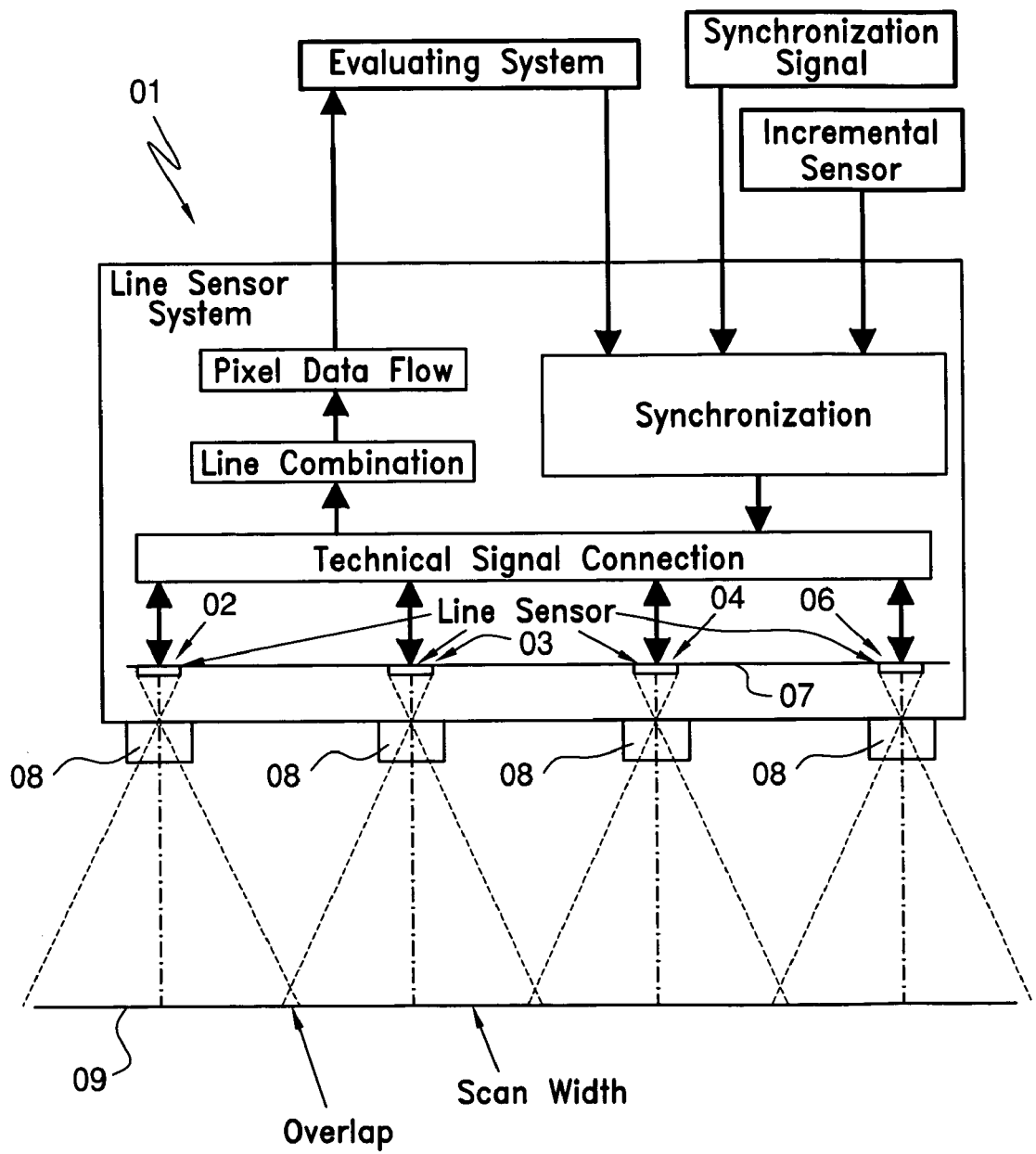

The image sensor 01 in accordance with the present invention is represented in FIG. 2 in a second operational state. In this second operational state, all of the pixels of the individual sensors 02 and 03 are read out, so that a line extending over the entire width of the object 09 to be recorded is recorded and can be evaluated. In this case, the recording areas of the individual sensors 02 and 03 slightly overlap. This slight overlap is provided in order to prevent gaps in the recording area of the image sensor 01, as a whole. However, with the date flow, the image sensor passes each image point on the entire scanning line on to the downstream connected evaluating device only once.

In a third operational state of the image sensor, which is not specifically depicted, it is also possible to reduce the resolution, in partial areas of the entire scanning line, by reading out sub-pixels. The result is that gaps are left between the read-out pixels. In addition to a possible limitation of the read-out image areas over the entire image sensor length, it is possible in this operational state to read out areas of different importance at either full or at reduced resolution.

The image sensor can be employed, in particular, for inspecting printed products.

While preferred embodiments of a method for evaluating an electronic image sensor, in accordance with the present invention, have been set forth fully and completely hereinabove, it will be apparent to one of skill in the art that various changes in, for example, the specific structure of the support, the type of printed products to be inspected, and the like can be made without departing from the true spirit and scope of the present invention which is accordingly to be limited only by the appended claims.

What is claimed is:

1. A method for evaluating an image including;
providing an electronic image evaluating system;
providing an electronic image sensor in said electronic image evaluating system;
providing a plurality of individual sensors in said electronic image sensor;
providing a plurality of pixels in each of said plurality of individual sensors;
reading out all of said pixels for at least one of said plurality of individual sensors in said electronic image evaluating device;
determining a position of a characteristic in an image area of said image to be evaluated in response to said reading out of all of said pixels for said at least one individual sensor;
reading out only selected ones of said plurality of pixels in said at least one of said plurality of individual sensors in said electronic image evaluating device corresponding with said position of said characteristic of said image to be evaluated;
blanking out remaining ones of said plurality of pixels in said at least one of said plurality of individual image sensors in accordance with image areas of said image sensed by said plurality of pixels not corresponding with said position of said characteristic to be evaluated; and
providing an amount of image data to be processed in said electronic image evaluating system corresponding to said reading out of only said selected ones of said plurality of pixels corresponding to said position of said characteristic to be evaluated.

2. The method of claim 1 further including reading out said remaining pixels of each said individual sensor having each said pixel emitting its own signal.

3. The method of claim 1 further including providing output signals from each of said individual sensors, and evaluating said output signals with reference to each other for recording said image information recorded along a line of an object to be recorded in a correct geometric position.

4. The method of claim 3 further including partially reading out several pixels of said at least one individual sensor for recording a position of said line of an object.

5. The method of claim 4 including changing said pixels of said individual sensor being partially read in response to movement of the object.

6. The method of claim 1 further including using said electronic image sensor for inspecting printed products.

7. The method of claim 1 further including providing a separate optical device for each said individual sensor for recording said image area of an object to be evaluated by each said individual sensor.

8. The method of claim 7 further including locating said image area of an object to be evaluated directly opposite an associated one of said optical devices.

9. The method of claim 8 further including arranging said individual sensors, said optical devices and the object to be recorded on a straight line.

* * * * *